United States Patent
Gielen et al.

(10) Patent No.: US 11,175,022 B2
(45) Date of Patent: Nov. 16, 2021

(54) LIGHTING MODULE ASSEMBLY

(71) Applicant: SIGNIFY HOLDING B.V., Eindhoven (NL)

(72) Inventors: Vincent Stefan David Gielen, Gastel (NL); Anna Wilhelmina Wondergem-De Best, Veldhoven (NL); Nicolaas Antonie Van Rijswijk, Oss (NL); Rene Theodorus Wegh, Veldhoven (NL); Gerardus Everardus Marie Hannen, Weert (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/758,337

(22) PCT Filed: Oct. 23, 2018

(86) PCT No.: PCT/EP2018/078982
§ 371 (c)(1),
(2) Date: Apr. 22, 2020

(87) PCT Pub. No.: WO2019/081476
PCT Pub. Date: May 2, 2019

(65) Prior Publication Data
US 2020/0340647 A1    Oct. 29, 2020

(30) Foreign Application Priority Data
Oct. 26, 2017    (EP) ...................................... 17198568

(51) Int. Cl.
*F21V 17/16*    (2006.01)
*F21V 23/00*    (2015.01)
(Continued)

(52) U.S. Cl.
CPC .......... *F21V 17/164* (2013.01); *F21V 23/003* (2013.01); *G02B 6/009* (2013.01);
(Continued)

(58) Field of Classification Search
None
See application file for complete search history.

(56) References Cited

U.S. PATENT DOCUMENTS 7,556,418 B2 *   7/2009   Shin ................... G02F 1/133608
                                                  362/633
7,580,250 B2 *   8/2009   Shin ..................... G02B 6/0088
                                                  361/679.21
(Continued)

FOREIGN PATENT DOCUMENTS

KR    101340053 B1    12/2013
KR    101604290 B1    3/2016
KR    1694150 B1      1/2017

*Primary Examiner* — Elmito Breval
(74) *Attorney, Agent, or Firm* — Daniel J. Piotrowski (57) ABSTRACT

A lighting module assembly (1000) comprising a stack of optical elements (1001), a plurality of elongated arms (1010, 1020, 1030, 1040) forming a frame (1005) for supporting the stack of optical elements (1001), at least one arm (1010) having a cavity (1015) extending in an elongation direction of the arm (1010), and at least one lighting element (1090). The cavity (11015) is arranged for receiving the at least one lighting element (1090) and for directing the light (1006) of the lighting element (1090), in use, to the stack (1001), and each elongated arm (1010, 1020, 1030, 1040) is formed by a first elongated arm part (1011). The stack (1001) comprises a diffuser (1002), a light guide plate (1003), and a reflector (1004). At least one first elongated arm parts (1011) is integrally formed with at least one of the diffuser (1002), and the light guide plate (1003).

15 Claims, 9 Drawing Sheets

(51) Int. Cl.
*F21V 8/00* (2006.01)
*F21Y 115/10* (2016.01)

(52) U.S. Cl.
CPC ......... *G02B 6/0021* (2013.01); *G02B 6/0051* (2013.01); *G02B 6/0055* (2013.01); *G02B 6/0085* (2013.01); *G02B 6/0088* (2013.01); *G02B 6/0091* (2013.01); *F21Y 2115/10* (2016.08); *G02B 6/0073* (2013.01)

(56) References Cited

U.S. PATENT DOCUMENTS

| | | |
|---|---|---|
| 9,217,823 B2 | 12/2015 | Kuo et al. |
| 2003/0043314 A1 | 3/2003 | Lee et al. |
| 2005/0140850 A1 | 6/2005 | Su et al. |
| 2006/0120112 A1* | 6/2006 | Lin ................... G02B 6/0021 362/626 |
| 2012/0320624 A1* | 12/2012 | Yamane ................ H04M 1/22 362/602 |
| 2014/0204607 A1* | 7/2014 | Yan ................... G02B 6/0073 362/606 |

* cited by examiner

LIGHTING MODULE ASSEMBLY

CROSS-REFERENCE TO PRIOR APPLICATIONS

This application is the U.S. National Phase application under 35 U.S.C. § 371 of International Application No. PCT/EP2018/078982, filed on Oct. 23, 2018, which claims the benefit of European Patent Application No. 17198568.2, filed on Oct. 26, 2017. These applications are hereby incorporated by reference herein.

FIELD OF THE INVENTION

The invention relates to a lighting module assembly.

BACKGROUND

Lighting-panels typically include a rigid lighting module structure, e.g. of square or rectangular shape, in which, for example, LED bars are mounted on the sides of the square or rectangle, and a vertical stack of different plates is assembled for concentrating the light of the LED bars towards an optical exit of the panel. The vertical stack includes for example a diffuser, a light guide plate, a reflector.

The lighting modules of the panels are typically packaged and shipped in boxes separated from the stack. The lighting modules are thus shipped either fully assembled, i.e. containing the fully mounted module, thus with the same size of the rigid module structure or disassembled in different parts, i.e. where different parts of the module structure need to be assembled together after unboxing.

In the first case, pre-assembling of the module requires some work before the module can be shipped.

In the second case, installation is not straightforward because the installer needs to assemble the different parts of the module together, with for example screws or clips to maintain the structure rigid. Thus installation is slower and requires quite some extra effort.

Depending on the amount of parts that need to be assembled, assembling of the module may require some effort. Further, electronic parts as the LEDs bars and the electronic circuitry to operatively control the LEDs, need to be installed in the module. Depending on a geometry of the module, installation of such electronic parts in the module can be (less/more) difficult.

For example, Korean patent KR1604290B1 describes an edge-type lighting panel device including an internal cover including symmetric supporting rail units and fixing flange units extending toward the outside of the supporting rail units to form a fixing portion for fixing screws. A PCB module carrying a LED bar is disposed on an inner side wall of any one of the supporting rail units. Part of the internal cover has one end portion in contact with the PCB module to radiate heat from the PCB module to the outside. A stack of a reflector, light guide plate and diffusing plate is arranged in a manner to be supported by the rail units. In some embodiments, the diffusing plate can be integrally formed with the fixing portion to form an out cover through which, in use, light can exit.

However, the device described in KR1604290B1 requires an installer of the module to take from the package box, the different parts and to assemble them together by for example fixing screws. The installer needs thus to insert the fixing screws in the fixing portion and to fasten the supporting rail units to the fixing flange units. Further, for geometry of lighting panels as the type described in KR1604290B1, it may be difficult to mount the various electronic parts in the inner side walls of the supporting rail units after the panel has been mounted into a rigid structure because it may be more difficult to access the inner side walls after the panel has been assembled. Therefore, assembling of the module may take considerable time.

US2003/043314 discloses a liquid crystal display device which comprises: a light generating means for generating a light; a light guiding means for guiding the light to a display means for displaying an image; a reflecting means disposed under said light guiding means, for reflecting the light toward said light guiding means; and a receiving means for receiving said reflecting means, said light guiding means and said light generating means. Said receiving means comprises at least one boss at a bottom surface thereof, said at least one boss guiding a position of said light generating means and preventing said light generating means from being moved.

US2005/140850 discloses an edge backlight module which comprises: a reflective back plate having a reflective surface and a wraparound end facing the reflective surface; a light guide plate disposed at the reflective surface of the reflective back plate, an end of the light guide plate connected to the wraparound end to form a cavity therebetween; and a light source module disposed in the cavity.

SUMMARY OF THE INVENTION

It would be advantageous to have an improved lighting-module which can be assembled more easily and in less time. It would also be advantageous to have an improved lighting-module which provides improved ingress protection from the front. It would also be advantageous to have an improved lighting-module which provides an improved light effect from the edge. It would also be advantageous to have an improved lighting-module which provides an improved homogenous appearance from the front.

One aspect of the invention provides a lighting module assembly. The lighting module assembly comprises a stack of optical elements comprising a diffuser, a light guide plate, and a reflector. The lighting module assembly comprises a plurality of elongated arms forming a frame for supporting the stack of optical elements (1001), at least one elongated arm having a cavity extending in an elongation direction of the elongated arm, and at least one lighting element. The cavity is arranged for receiving the at least one lighting element and for directing the light of the lighting element, in use, to the stack of optical elements. Each elongated arm is formed by a first elongated arm part. At least one first elongated arm part is integrally formed with at least one of the diffuser, and the light guide plate.

Since the first elongated arm parts are integrally formed with any of at least one of the diffuser, and the light guide plate, part of the frame supporting the stack is already formed and does not need to be mounted by screws or the like and fewer optical elements need to be stacked. Lighting module assembly can be assembled with fewer assembling steps because less components are to be assembled together.

Lighting module assemblies are typically mounted onto a flat surface such as, for example, a wall or a ceiling. Hence the luminaire is exposed to the ambient mainly via its front side, said front side thus determines to a major part the degree of protection against ingress. Integration of the first elongated arm parts with the diffuser or the light guide plate provides improved ingress protection from the front and thus to the whole lighting module. In other words, the light source is better protected against intrusion of e.g. water and dust resulting in a relatively safe, reliable lighting module with likely also an increased lifetime. Ingress protection is particularly needed to protect the light emitting element such as LEDs and/or electronics.

The edge of lighting module assemblies does not emit or provides less light. Integration of the first elongated arm parts with the diffuser or the light guide plate provides an improved light effect from the edge. In other words, light of the light emitting element can escape from the lighting module assembly from the edge because of the integration of the first elongated arm parts with the diffuser or the light guide plate.

The edge of lighting module assemblies is visible and does not provide a homogeneous appearance. Integration of the first elongated arm parts with the diffuser provides improved homogeneous appearance from the front. In other words, the edge is rendered more unobtrusive.

In an embodiment, at least one elongated arm comprises a second elongated arm part for mating the first elongated arm part in the elongation direction for enclosing the lighting element in the cavity.

Since the lighting element is enclosed in the cavity of the elongated arm and the arm is formed by two arm parts which can be mated together, it is much easier to insert the lighting element, for example, in the first arm part, which is integrally formed, and cover said first arm part with the second part in a box-like manner.

The elongated arm parts may be mated together either by closing and matching to each other two separate arm parts or, when the two elongated arm parts are connected to each other at one side, by closing and matching to each other respective open sides of the two elongated arms.

For example, in an embodiment, the first elongated arm part and the second elongated arm part are integrally formed and connected together by a living hinge such that the first elongated arm part and second elongated arm part are arranged to be mated by bending the second elongated arm part relative to the first elongated arm part along the living hinge.

Assembly of the module has been made easier because the frame surrounding the optical stack is integrally formed and fewer loose parts need to be assembled together.

In an embodiment, the lighting module assembly comprises a driver unit arranged in one of the cavities for controlling the at least one lighting element.

Thus, the cavity can be also used for assembling a driver unit for driving the lighting element. The mated arm parts can accommodate a driver unit, a lighting element or in further embodiments, any electrical or mechanical components of the module suitable for installing and operating the module.

In an embodiment, the diffuser, or the light guide plate may be integrally formed with the first elongated arm part and/or second elongated arm part, for example by injection molding. Thus at least one elongated arm part may be integrally formed with at least one of the diffuser, and the light guide plate. In an embodiment, at least two elongated arm parts are integrally formed with at least one of the diffuser, and the light guide plate. In an embodiment, at least three elongated arm parts are integrally formed with at least one of the diffuser, and the light guide plate. In an embodiment, at least four elongated arm parts are integrally formed with at least one of the diffuser, and the light guide plate.

If any of the diffuser, or light guide plate is integrally formed with any of the elongated arm parts, the lighting module assembly has less loose parts yet and it is more easily assembled.

In an embodiment, the first arm part of elongated arm may be integrally formed with diffuser of stack of optical elements at the side of the lighting module assembly where the lighting element is arranged.

In an embodiment, the first arm part of elongated arm may be integrally formed with light guide plate of stack of optical elements at the side of the lighting module assembly where the lighting element is arranged.

In an embodiment, the first elongated arm part and/or the second elongated arm part are made of plastic, preferably polycarbonate or acrylic.

Thus lighting module is lighter, can be manufactured and shipped at less costs. In particular, when any of the diffuser, or light guide plate is integrally formed with the plastic first elongated arm part or plastic second elongated arm part, the lighting module assembly is particularly light and can be manufactured in a streamlined manner.

In an embodiment, the diffuser is integrally formed with the first elongated arm parts and comprises a protrusion along edges of the lighting module assembly overlapping the lighting element. The protrusion extends with a slanted profile towards a direction perpendicular to the elongation direction along which the light, in use, exits the module. Preferably the slanted profile has an angle of 45 degrees or less.

By providing the integrated diffuser with a protrusion having a slanted profile, in use, light spots at the edges of the lighting module assembly can be prevented while at the same time some light is allowed to reach the very far edges beyond the protrusion, thereby eliminating so-called dark-rim effects.

In an embodiment, the light guide plate is integrally formed with the first elongated arm parts. The light guide plate comprises elongated openings through the light guide plate arranged in the elongation direction at edges of the lighting module assembly in proximity of the elongated arms. The openings allow to confine, in use, the light within the light guide plate preventing the light to reach the frame and thereby to undesirably disperse in the surrounding environment.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings.

LIST OF REFERENCE NUMERALS IN FIGS. 1-10

| | |
|---|---|
| 100, 200, 300, 400, 500, 600, 700, 1000 | a lighting module assembly |
| 10, 20, 30, 40, 210, 220, 230, 240, 540, 610, 1010, 1020, 1030, 1040 | an elongated arm |
| 11, 21, 211, 311, 411, 611, 1011 | a first elongated arm part |
| 12, 22, 212, 312, 412, 612 | a second elongated arm part |
| 14, 24, 24', 624 | an engaging element |
| 17, 27, 28, 627 | a receiving element |
| 19, 429 | a groove |
| 23 | an interlocking feature |
| 26, 27 | a backside of an arm |
| 33, 34, 37, 38 | an elongated support profile |
| 5, 35, 205, 315, 415 | a hinge |
| 36 | an axis |
| 15, 25, 305, 405, 1015 | a cavity |
| 225, 325, 425, 625 | a heat spreading element |
| 71, 72, 73 | a thin wall |
| 75, 85 | an isolating layer |
| 390, 490, 690, 1090 | a lighting element |
| 291, 93 | a driver unit |
| 316, 416, 516, 616, 1004 | a reflector |
| 317, 417, 517, 617, 1003 | a light guide plate |
| 318, 418, 518, 618, 1002 | a diffuser |
| 327, 427 | a spring portion |
| 329 | a receiving portion |
| 219, 319, 419, 519, 619, 1001 | a stack of optical elements |
| 521, 522, 524, 525 | an elongated opening |
| 523 | a bridge portion |
| 501, 502 | an enlarged view |
| 250, 350, 450, 550, 1005 | a frame |
| 621 | an optical sheet |
| 680 | a protrusion |
| 1006 | a light |

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

Further, the invention is not limited to the embodiments, and the invention lies in each and every novel feature or combination of features described herein or recited in mutually different dependent claims.

Figure 1A:
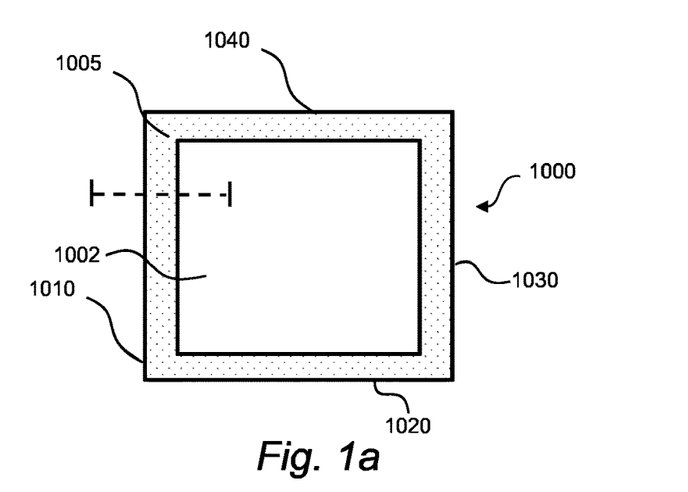
FIG. 1a shows a top view of an embodiment of a lighting module assembly.
Figure 1B:
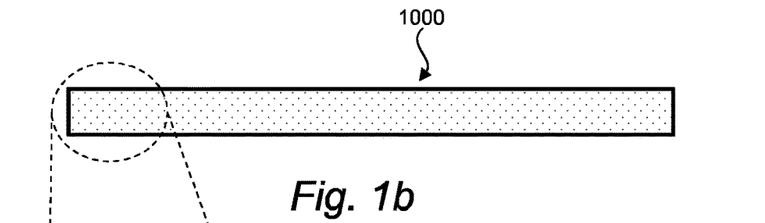
FIG. 1b shows a lateral view of the embodiment of the lighting module assembly of FIG. 1a, FIG. 1c shows a cross sectional view of an embodiment of a lighting module assembly.

FIG. 1*a* shows a top view of an embodiment of a lighting module assembly 1000. FIG. 1*b* shows a lateral view of the embodiment of the lighting module assembly 1000.

With reference to FIG. 1*a*, lighting module assembly 1000 comprises four integrally connected elongated arms 1010, 1020 and 1030 and 1040 and at least one lighting element not shown in FIG. 1*a*. Elongated arms 1010, 1020, 1030 and 1040 shown in FIG. 1*a* have approximately the same length and same thickness.

However, a lighting module assembly may comprise less than four elongated arms or more than four elongated arms for obtaining different shapes. The lighting module assembly may comprise more than one lighting element, for example two or more.

In some embodiments, the elongated arms have different lengths and/or different thickness.

Lighting module assembly 1000 is used for assembling a stack of optical elements. The stack comprise a diffuser 1002, a light guide plate and a reflector. FIG. 1*a* shows only diffuser 1002, being the light guide plate and the reflector arranged under diffuser 1002 in the stack as shown later. The plurality of elongated arms 1010, 1020, 1030, 1040 forms a frame 1005 e.g. a rigid frame for supporting the stack of optical elements. Frame 1005 may, as shown in FIG. 1*a*, surround the stack. When the stack of optical elements is assembled, the lighting module assembly can be installed for example on a ceiling, wall, pavement, or any other suitable surface or location. The lighting module assembly can be used to illuminate the environment or used as display panel for displaying commercials, videos, photos or posters. Lighting module assembly may be used in any kind of indoor or outdoor illumination, for commercial, private or professional use. In use, the light exit diffuser 1002, thus illuminating the environment.

Each elongated arm 1010, 1020, 1030 and 1040 is formed by a first elongated arm part (not shown in FIG. 1*a* and FIG. 1*b*).

The first elongated arm parts are integrally formed with at least one of the diffuser, the light guide plate, and the reflector.

Figure 1C:
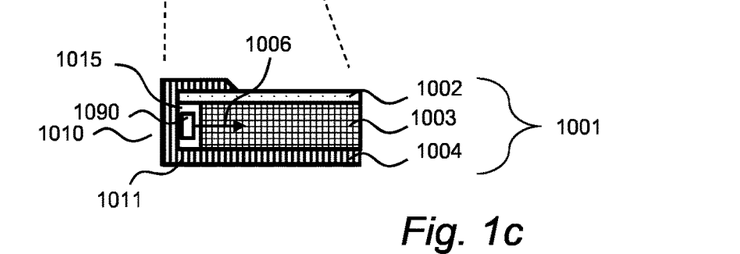
Figure 1D:
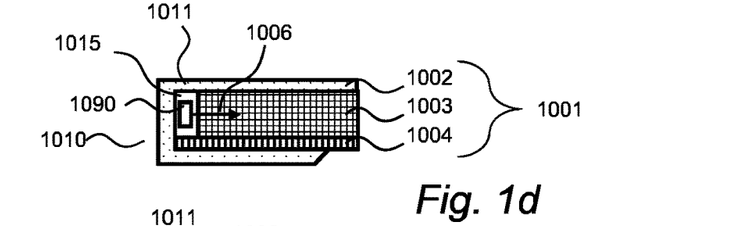
FIG. 1d shows a cross sectional view of an embodiment of a lighting module assembly.

FIG. 1*c*-1*d* show cross sectional views taken across elongated arm 1010 of FIG. 1 a for three different embodiments of a lighting module assembly in which the first elongated arm parts are integrally formed with the diffuser, the light guide plate and the reflector respectively.

For example, FIG. 1*c* shows a cross sectional view of an embodiment of a lighting module assembly taken across the dashed line of FIG. 1*a*.

At least one arm, in this example arm 1010, has a cavity 1015 extending in an elongation direction of the arm. Cavity 1015 is arranged for receiving a lighting element 1090 and for directing the light 1006 of the lighting element, in use, to the stack 10.

In this example, elongated arm 1010 is formed by a first elongated arm part 1011 which is integrally formed with the reflector 1004. Above reflector 1004 from the bottom of stack 1001 of optical elements are arranged the light guide plate 1003 and the diffuser 1002.

FIG. 1d shows a cross sectional view of another embodiment of a lighting module assembly.

In this embodiment, first arm part 1011 of elongated arm 1010 is integrally formed with diffuser 1002 of stack 1001 of optical elements 1002, 1003 and 1004. As depicted in FIG. 1d, first arm part 1011 of elongated arm 1010 may be integrally formed with diffuser 1002 of stack 1001 of optical elements 1002, 1003 and 1004 at the side of the lighting module assembly where the lighting element is arranged.

Figure 1E:
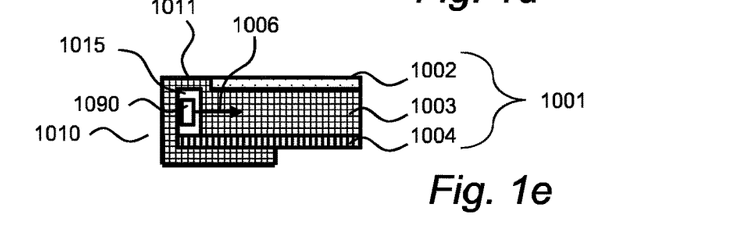
FIG. 1e shows a cross sectional view of an embodiment of a lighting module assembly, FIG. 1f schematically shows a perspective view of an example of an embodiment of a lighting module assembly, FIG. 2 schematically shows a first enlarged perspective view of the embodiment of the lighting module assembly of FIG. 1*f*, FIG. 3 schematically shows a second enlarged perspective view of the embodiment of the lighting module assembly of FIG. 1*f*, FIG. 4*a* schematically shows an exploded view of an embodiment of a lighting module assembly, FIG. 4*b* schematically shows a perspective view of the embodiment of the lighting module assembly of FIG. 4*a*, FIG. 4*c* schematically shows an exploded view of an embodiment of the lighting module assembly of FIG. 4*b* mounted on a frame, FIG. 5 schematically shows a cross sectional view of an example of an embodiment of a lighting module assembly, FIG. 6 schematically shows a cross sectional view of an example of an embodiment of a lighting module assembly, FIG. 7 schematically shows a perspective view of an example of an embodiment of a lighting module assembly, FIG. 7*a* schematically shows a first enlarged view of the embodiment of the lighting module assembly of FIG. 7, FIG. 7*b* schematically shows a second enlarged view of the embodiment of the lighting module assembly of FIG. 7, FIG. 8 schematically shows a perspective view of an embodiment of a lighting module assembly, FIG. 9 schematically shows an optical simulation of the embodiment of the light module assembly of FIG. 8, FIG. 10 schematically shows a cross sectional view of an example of an embodiment of a lighting module assembly.

FIG. 1e shows a cross sectional view of a further embodiment of a lighting module assembly.

In this embodiment, first arm part 1011 of elongated arm 1010 is integrally formed with light guide plate 1003 of stack 1001 of optical elements 1002, 1003 and 1004. As depicted in FIG. 1e, first arm part 1011 of elongated arm 1010 may be integrally formed with light guide plate 1003 of stack 1001 of optical elements 1002, 1003 and 1004 at the side of the lighting module assembly where the lighting element is arranged.

Thus, the first arm parts may be integrally formed, e.g. by injection molding, with any optical elements of the stack so as to simplify manufacturing and assembly of the module. Less parts need to be assembled. Costs of manufacturing the module are also decreased.

Figure 1F:
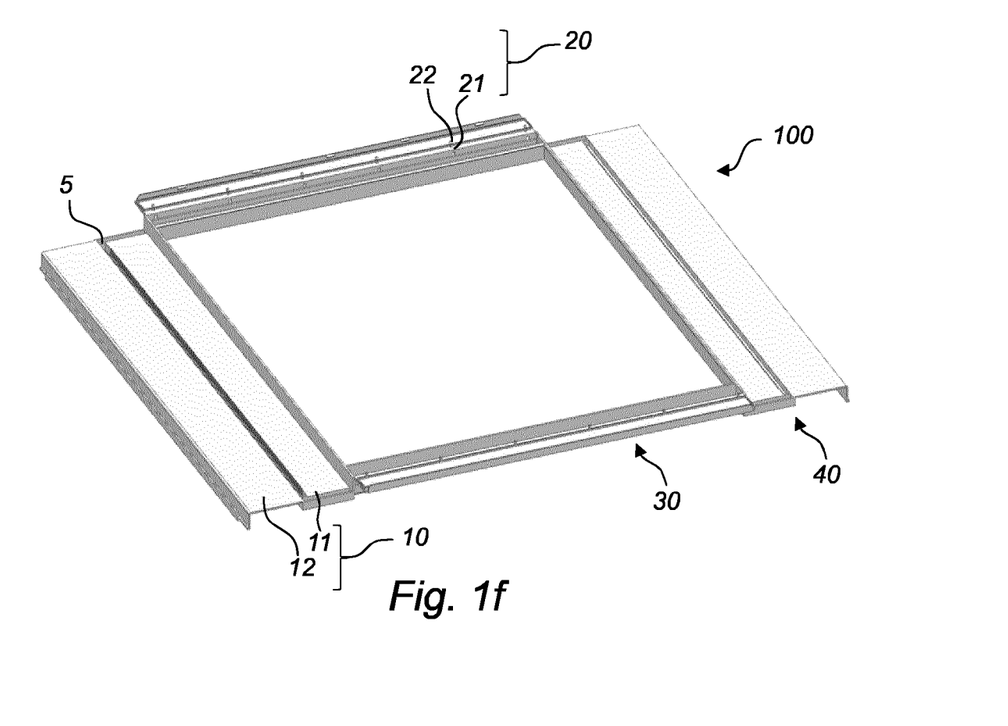

FIG. 1f schematically shows a perspective view of an example of an embodiment of a lighting module assembly 100.

With reference to FIG. 1f, lighting module assembly 100 comprises four integrally connected elongated arms 10, 20 and 30 and at least one lighting element not shown in FIG. 1f.

In this example, each arm 10, 20, 30, 40 has a cavity (not shown in FIG. 1f) extending in an elongation direction of the arm. The cavity is arranged for receiving the lighting element and for directing the light of the lighting element, in use, to the stack.

Differently from the embodiment shown through the FIGS. 1c-1d, in this example, each arm 10, 20, 30 and 40 comprises a second elongated arm part for mating the first elongated arm part in the elongation direction for enclosing the lighting element.

Thus, in other words, as shown in FIGS. 1c-1d, each elongated arm may be formed by a single part which is integrally formed with any one of the optical elements of the stack. At least one of the single parts forming the elongated arms has a cavity for receiving the lighting element in the manner described above.

Alternatively, as in the example shown in FIG. 1f, at least one elongated arm of the module may be formed by two separate parts mated together in a box-like manner and enclosing the cavity with the lighting element arranged therein.

As way of examples, we will refer in detail to the elongated arm parts of elongated arms 10 and 20. Elongated arms 30 and 40 are formed in the same manner.

Elongated arm 10 is formed by a first elongated arm part 11 and a second elongated arm part 12.

Elongated arm 20 is formed by a first elongated arm part 21 and second elongated arm part 22.

Elongated arms 30 and 40 are similarly formed by corresponding elongated first parts and corresponding elongated second parts.

In the example shown in FIG. 1f, the elongated arm parts forming arms 10, 20, 30 and 40 are integrally formed in a frame structure.

In an embodiment, as shown in FIG. 1f, the first elongated arm parts and the second elongated arm parts are integrally formed and connected together by a living hinge such that the first elongated arm part and the second elongated arm part are arranged to be mated by bending the second elongated arm part relative to the first elongated arm part along the living hinge. Referring to arm 10, first elongated arm part 11 and second elongated arm part 12 are integrally formed and connected together by a living hinge 5, which is, in this example, an elongated living hinge.

In an embodiment, shown later in the figures, only the first elongated arm parts may be integrally formed into a first frame structure. The second elongated arm parts may be integrally formed into a second frame structure which is arranged to mate the first frame structure for enclosing the one or more lighting elements into the corresponding cavities.

Alternatively, the second elongated arm parts may be designed as separate arm parts not integrally formed into a rigid structure mating the corresponding elongated arm parts for closing the respective cavities.

In an embodiment, the first elongated arm parts may be integrally formed, e.g. by injection molding.

In an embodiment, the second elongated arm parts may be integrally formed, e.g. by injection molding.

In an embodiment, elongated arms 10, 20, 30 and 40 may be integrally formed, e.g. by injection molding. For example, first, second elongated arm parts or elongated arms 10, 20, 30 and 40 may be made of plastic, for example injection molded.

In an embodiment, the first elongated arm part and/or the second elongated arm part may be made of plastic, preferably polycarbonate (PC) or acrylic (PMMA). However, the elongated arms may be made of any other suitable plastic material which ensures a sufficient stiffness of the frame for accommodating the lighting elements and optionally electrical and mechanical components, and for assembling the stack of optical elements.

Lighting module assembly made of plastic are lighter than conventional modules made of the steel or aluminum. The lighting module assembly made of plastic can be thus shipped at less cost.

Use of plastic as manufacturing material allows to construct modules which are transparent to radio frequency (RF) signals which may be used to control at a distance, for example via a wireless communication channel, the lighting elements. When the modules are made of plastics and not of metal, the RF signals travel with less reflection. Wireless transmission range from and to the lighting elements may be increased.

In an embodiment, shown later in the Figures, the lighting module assembly may comprise a driver unit arranged in one of the cavities for controlling the at least one lighting element.

In other words, the first and second elongated arm parts form, when mated to each other, a box compartment containing the lighting element and/or the electrical or mechanical component to operate the lighting element, for example the driver unit.

When the lighting module assembly comprises the driver unit, the lighting module assembly may be substantially ready for installation. The installer may have a functional module because electrical connections between the lighting elements and the driver unit may have already routed and functionally tested.

Several advantages are associated with lighting module 100. Since at least the first elongated arm parts are integrally formed, the frame of the module is ready for assembling the stack and there is no need of assembling the arms together with screws or the like. Installation is easier because only a few components are assembled, while in conventional modules many different parts are to be assembled together. Costs of installation are decreased. When fewer components are used also fewer interfaces between the different components are required to assemble the module. This in turns improves the stiffness of the modules of the invention because interfaces sometimes compromise stiffness.

Further, the cavities can be advantageously used as compartment boxes to easily pre-install lighting elements, electrical and mechanical components, drive units, routing wires between the different components and parts in the module. The compartment boxes are easily accessible from a bottom of the module. The components can be inserted inside the compartment boxes and then the compartment boxes can be easily closed by mating the first elongated arm parts with the second elongated arm parts.

Further, when the lighting module assembly is made of plastic, as described above, the lighting elements and/or the driver unit can be assembled inside the arms without placing extra electrical insulation layers between the lighting elements and/or the driver unit and a surface of the corresponding arms whereon the lighting elements and/or the driver unit are mounted. Since plastic is an electrically insulating material, the lighting module assembly is electrically insulated from the external environment which means that a safer product can be made at lower costs.

For example, it is not necessary to connect the plastic frame of the module to earth potential for safety reasons as instead it is typically done in conventional modules made with metal frames. No extra electrical insulation is required also on routing wires or printed circuit boards mounting the lighting elements, the driver units or other electrical or mechanical components of the module for obtaining a lighting module assembly with a high safety class. With the plastic modules of the invention, safety class 2 can be achieved without adopting any particular electrical insulation measure.

Figure 2:
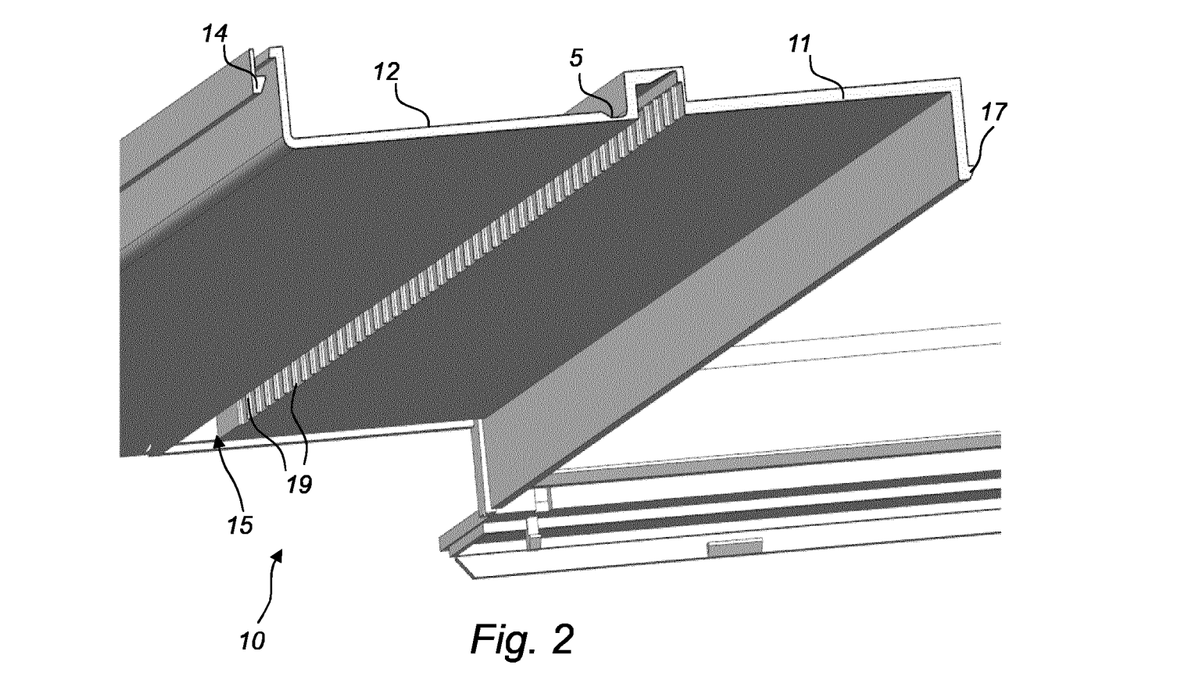

FIG. 2 schematically shows a first enlarged perspective view cross section of lighting module assembly 100 of FIG. 1f.

FIG. 2 shows in detail elongated arm 10 of the lighting module assembly 100 described with reference to FIG. 1f. Elongated arm 10 is formed by a first elongated arm part 11 and second elongated arm part 12 which are integrally formed and connected together by a living hinge 5. Living hinge 5 is in this example an elongated hinge as long as elongated arm 10.

In some embodiments, the living hinges are, e.g., integral hinges or film hinges, comprising a bendable sheet of material connected to the outer edges of first and second elongated arm parts for allowing bending of the arm parts relative to each other.

Living hinges, like film hinges and integral hinges, are well known in the art.

Living hinges are thin flexible hinges made from a material which is the same as the material of the parts they connect. They may be produced by injection molding in the same mold for producing the arm parts they connect. They may be thinned or cut to allow bending of the arms along a line of the hinges. In the example shown in FIG. 2, elongated second arm part 12 is thinned in correspondence of hinge 5.

Living hinges can be made out of plastics, for example polyamides or polypropylene, which can endure bending in thinnings.

Referring back to FIG. 2, a cavity 15 is provided in elongated arm part 11. However, cavity 15 may be provided in second elongated arm part 12 or partially in first elongated arm part 11 and partially in second elongated arm part 12. For example, first and second elongated arm parts may be hollowed to form a cavity. A lighting element (not shown in FIG. 2), for example, in the form of a LED bar, may be inserted in cavity 15. The lighting element is placed for directing the light, in use, towards the stack. In the example shown, the light is directed, in use, towards a direction perpendicular to the elongation direction along which first elongated arm part 11 laterally extends.

To this purpose, in the embodiment shown in FIG. 2, elongated arm part 11 is provided with grooves 19 inside cavity 15 in correspondence of each one of the LEDs of the LED bar in order to the let, in use, the light pass through grooves 19 and reach the optical stack (not shown in FIG. 2). Instead of grooves 19, other type of openings can be provided in the cavity, for example recesses in correspondence of the LEDs or larger opening in correspondence of a plurality of LEDs.

Depending on the plastic material used for the manufacturing of the lighting module assembly, no openings may be provided in the cavity. For example, the plastic material may be sufficiently transparent to light, in which case, light can pass through the plastic material and reach the stack of optical elements regardless whether the openings are provided or not.

Grooves or other type of openings may be provided in the cavity in the first elongated arm part as shown in FIG. 2, but also, depending on how the cavity is formed and/or on the geometry of the cavity, in the second elongated arm part, or partially in the first elongated arm part or second elongated arm part.

In the embodiment shown in FIG. 2, first elongated arm part 11 has a receiving element 17 and second elongated arm part has an engaging element 14. Engaging element 14 is configured to engage receiving element 17. Engaging element 14 and receiving element 17 of this example are extending along the elongation direction. However, other types of engaging elements and receiving elements can be conceived. For example, more than one engaging element and corresponding receiving elements can be used to match each other when the arm parts are mated together.

In an embodiment, the engaging element is arranged to snap into the receiving element. For example, one of the first or second arm part may be provided with one or more receiving elements in the form of openings into which corresponding one or more engaging elements may snap into. Different geometries of engaging and receiving elements are conceivable, being the embodiment of FIG. 2 purely illustrative of one of the many possible examples.

Figure 3:
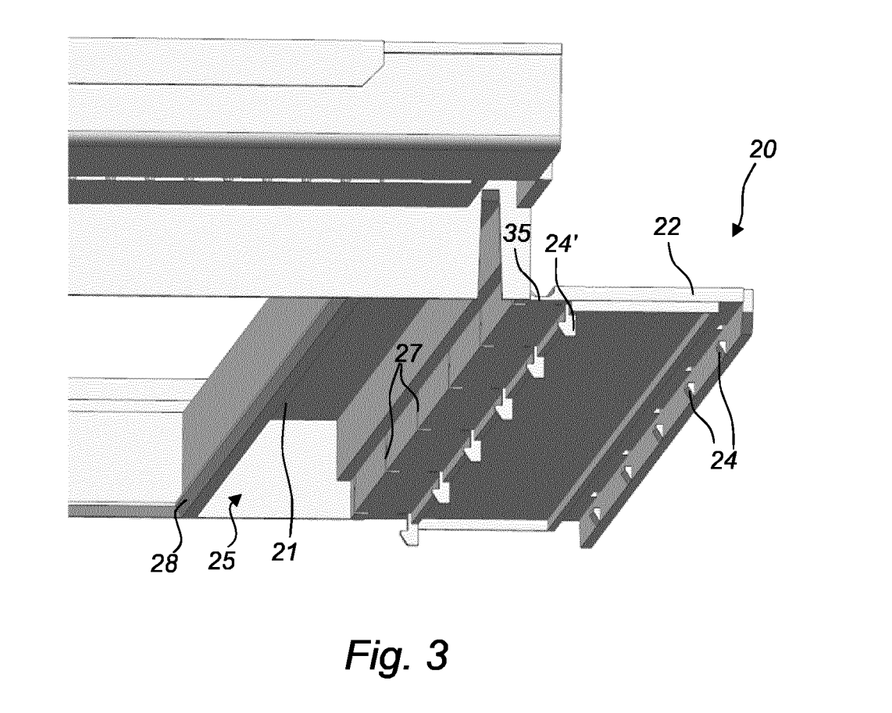

For example, with reference to FIG. 3 showing a second enlarged perspective view of the embodiment of lighting module assembly 100 of FIG. 1f, a plurality of engaging elements 24 arranged in elongated arm part 22 is arranged to fit into a single elongated receiving element 28 arranged in elongated arm part 21.

In the same example, a plurality of engaging elements 24' in the form of a plurality of thin profiled protrusions of elongated arm part 22 are arranged to fit into receiving elements 27 in the form of slits for receiving the thin protrusions.

FIG. 3 shows an enlargement view of elongated arm 20 of the lighting module assembly 100 described with reference to FIG. 1f. Elongated arm parts 21 and 22 are connected together by elongated living hinge 35 and bended towards each other along living hinge 35. Elongated arm part 21 is provided with a cavity 25 which is used for receiving electrical or mechanical components, for example the driver unit for controlling the lighting elements arranged inside the cavities of the other arms or other arm parts.

Cavity 25 is deeper and more spacious than cavity 15 described with reference to FIG. 2, which may be more suitable for containing larger electrical or mechanical components.

Figure 4A:
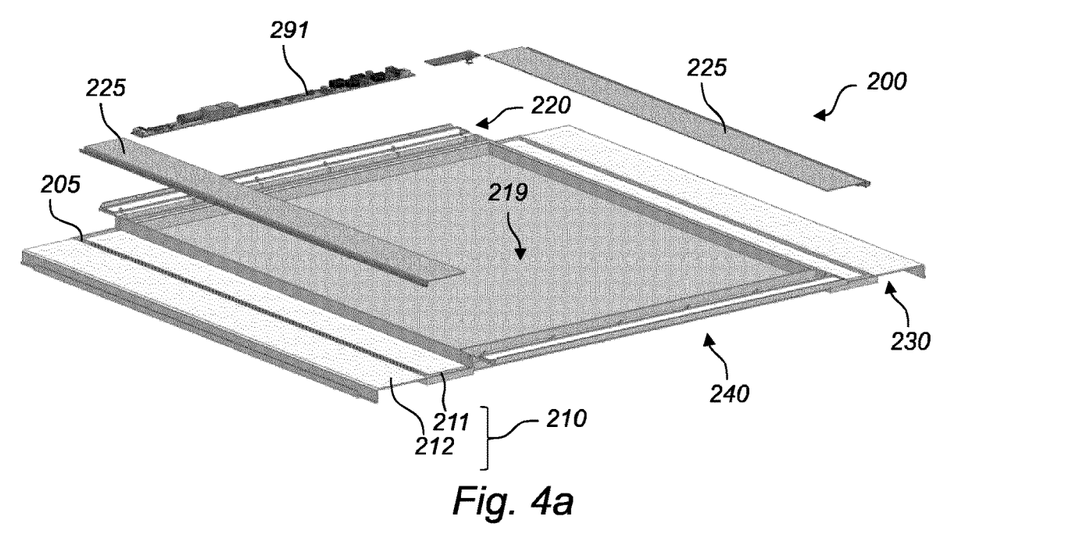

FIG. 4a schematically shows an exploded view of an embodiment of a lighting module assembly 200. The exploded view shows lighting module assembly 200 from the bottom, i.e. a side which is opposite to a side from which light, in use, exits lighting module assembly 200. Lighting module assembly 200 comprises elongated arms 210, 220, 230, and 240. Each arm 210-240 is formed by mating two arm parts as described above, connected, in this particular example, by a respective elongated living hinge for enclosing lighting elements and/or electrical or mechanical components inside the arms.

For illustrative purpose, only elongated arm parts 211 and 212 forming elongated arm 210 and connected by elongated living hinge 205 are indicated in FIG. 4a. Other elongated arms 220-240 have similar construction.

Lighting module assembly 200 differs from lighting module assembly 100 described with reference to FIG. 1f in that lighting module assembly 200 further integrates one or more elements of a stack of optical elements 219. In addition or alternatively, lighting module assembly may comprise further module elements, such as heat spreading elements 225 for improving, in use, reliability of the lighting module assembly 200. In addition or alternatively, lighting module assembly may comprise further electrical components, such as driver unit 291 which is, in the example shown in FIG. 4a, inserted inside elongated arm 220.

Stack 219 may comprise at least one of a diffuser, a light guide plate, a reflector. The diffuser, the light guide plate and the reflector are arranged in this order from a side of lighting module assembly 200 from which, in use, the light exits the lighting module assembly 200.

The diffuser, light guide plate, or reflector may be integrally formed with the first elongated arm part and/or second elongated arm part.

In an embodiment, the diffuser, light guide plate or reflector may be integrally formed with elongated arms 210-240.

Thus lighting module assembly 200 may, for most part, be integrally formed, by, for example, injection molding. The manufacturing costs of lighting module assembly 200 are further decreased, and stiffness of the module is improved because the number of loose assembled parts is reduced. Further, since the module may, for most part, integrally formed, costs of manufacturing the module are decreased because only one process, for example injection molding, is used to manufacture most of the lighting module assembly.

Heat spreading elements 225 are used for spreading the heat generated, in use, by the lighting element. Heat spreading elements are arranged in the cavities (not indicated in FIG. 4a) of arms 210 and 230 on a back side of the lighting elements (not shown in FIG. 4a) for supporting the lighting elements in the cavities Heat spreading elements 225 are inserted inside facing elongated arms 210 and 230 which contain respective lighting elements. Heat spreading elements 225 may be made of material having sufficiently low thermal resistivity for spreading heat away from the lighting elements. For example, heat spreading elements 225 may be made of metal or the like. Heat spreading elements 225 partially extend under the stack 219, for example between stack 219 and second elongated arm parts of which only second elongated arm part 212 is shown in FIG. 4a. Heat spreading elements 225 may be used to support the lighting elements. The lighting elements may be arranged on a side portion of heating spreading elements 225 arranged in the cavity and laterally facing the stack. When lighting module assembly is operative, heat generated by the lighting elements is discharged away via this side portion and further via the portion of heat spreading elements 225 extending under stack. The heat is then diffused across the stack and across the second elongated arm part overlapping the stack to the surrounding environment.

Figure 4B:
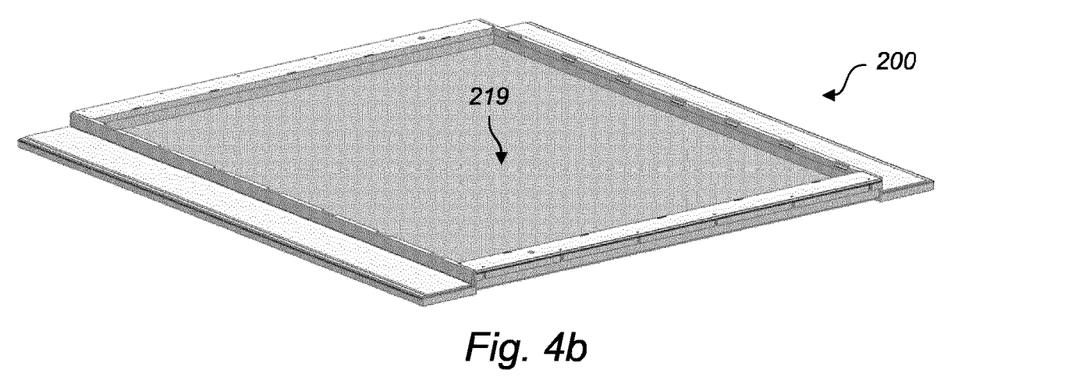

FIG. 4b schematically shows a perspective view of the embodiment of the lighting module assembly 200 of FIG. 4a when the second elongated arm parts have been closed along the corresponding hinges. The closed arms form compartment boxes containing the electrical or mechanical components of the module. The compartment boxes may electrically communicate between each other and with the exterior through for example holes (not shown in the figures) used to route electrical wires between the boxes and between the boxes and the exterior.

Figure 4C:
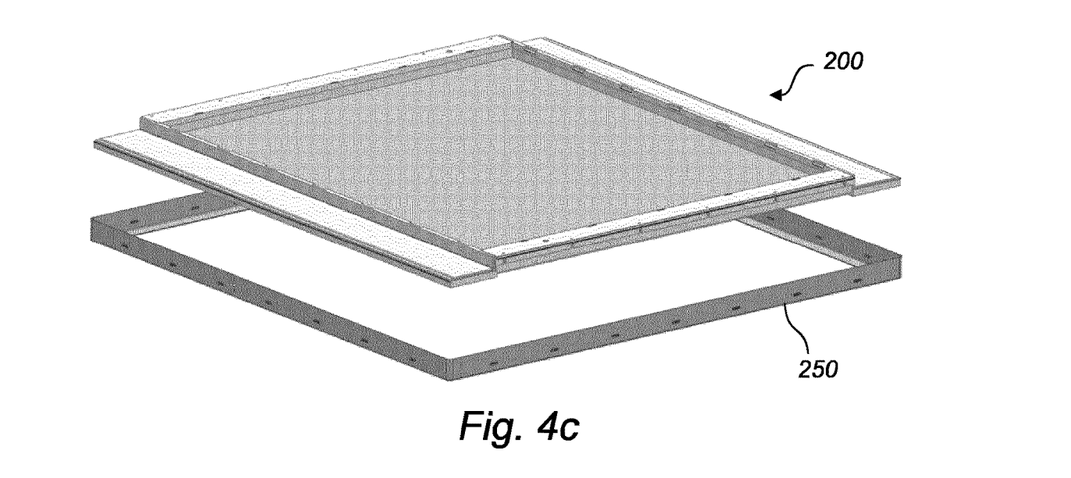

FIG. 4c schematically shows an exploded view of an embodiment of a lighting module assembly 200 mounted on a frame 250. Frame 250 may be further assembled on lighting module assembly 200. Frame 250 may have both functional and esthetical purpose. The frame may give a flat frame shape to the module while and at the same time allowing the module to be installed. For example, lighting module assembly 200 may be hung via frame 250 positioned against T bars installed on ceilings.

Figure 5:
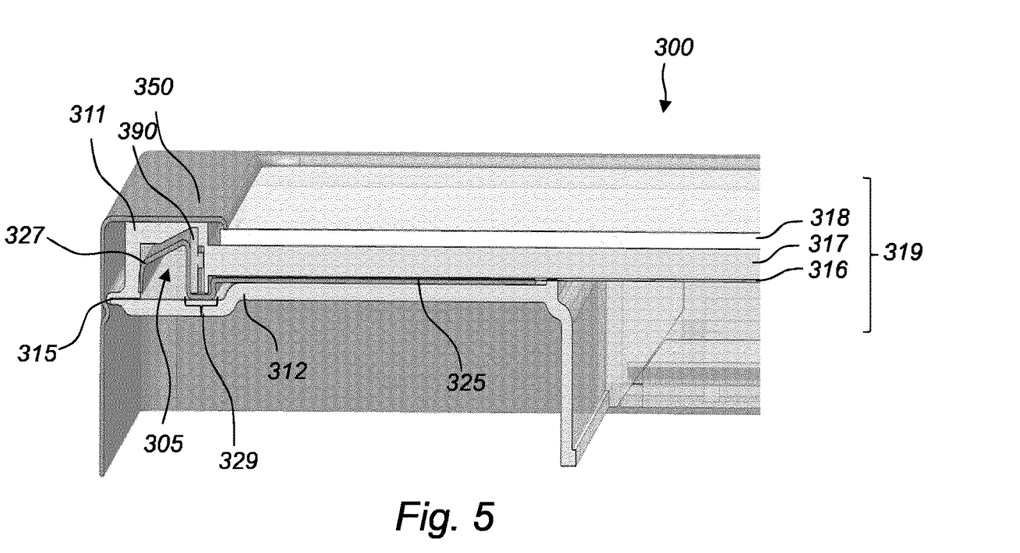

FIG. 5 schematically shows a cross sectional view of an example of an embodiment of a lighting module assembly 300.

The cross sectional view of FIG. 5 is taken a cross section along one of the elongated arms. FIG. 5 shows a first elongated arm part 311 and a second elongated arm part 312 connected by elongated hinge 315.

Lighting module assembly 300 further comprises lighting element 390, stack 319 of optical elements 316, 317 and 318, heat spreading element 325 and frame 350 for aesthetical as well as installation purposes.

Heat spreading element 325 is partially arranged into a cavity 305 formed by arm parts 311 and 312 and partially arranged and extending under stack 319 between stack 319 and arm part 312.

Lighting element 390 is arranged with a backside placed on heat spreading element 325 such that, in use, light is directed towards the stack and generated heat is discharged from lighting element 390 to heat spreading element 325 and from heat spreading element 325 to the surrounding environment.

In an embodiment, a portion of heat spreading element 325 arranged inside the cavity 305 has a spring portion 327 that, when it is loaded, it is arranged to snap into cavity 305. In this manner, heat spreading element 325 can be fixedly arranged within cavity 305 without using screws or the like.

Further, in an embodiment, heat spreading element 325 may comprise a receiving portion 329 for receiving lighting element 390 at its backside and for fixedly fitting lighting element 390 within cavity 305 such that lighting element 390 does not move within cavity 305 even when lighting element 390 is not glued or attached by any means to heat spreading element 325. Assembly of the module has been further simplified.

Optical stack 319 comprises a reflector 316, a light guide plate 317 and a diffuser 318. Light guide plate 317 is integrally formed with first arm part 311 and second arm part 312 via hinge 315. Since light guide plate 317 directs the light, in use, across the lighting module assembly, the material of light guide plate 317 should be transmitting the light across the lighting module assembly. Since light guide plate 317 is made of a plastic material which transmits light and light guide plate 317 is integrally formed with first elongated arm part 311, there is no need of providing first elongated arm part 311 with openings for directing the light, in use, towards stack 319. The plastic material is preferably acrylic (PMMA) which can sufficiently transmit light.

Figure 6:
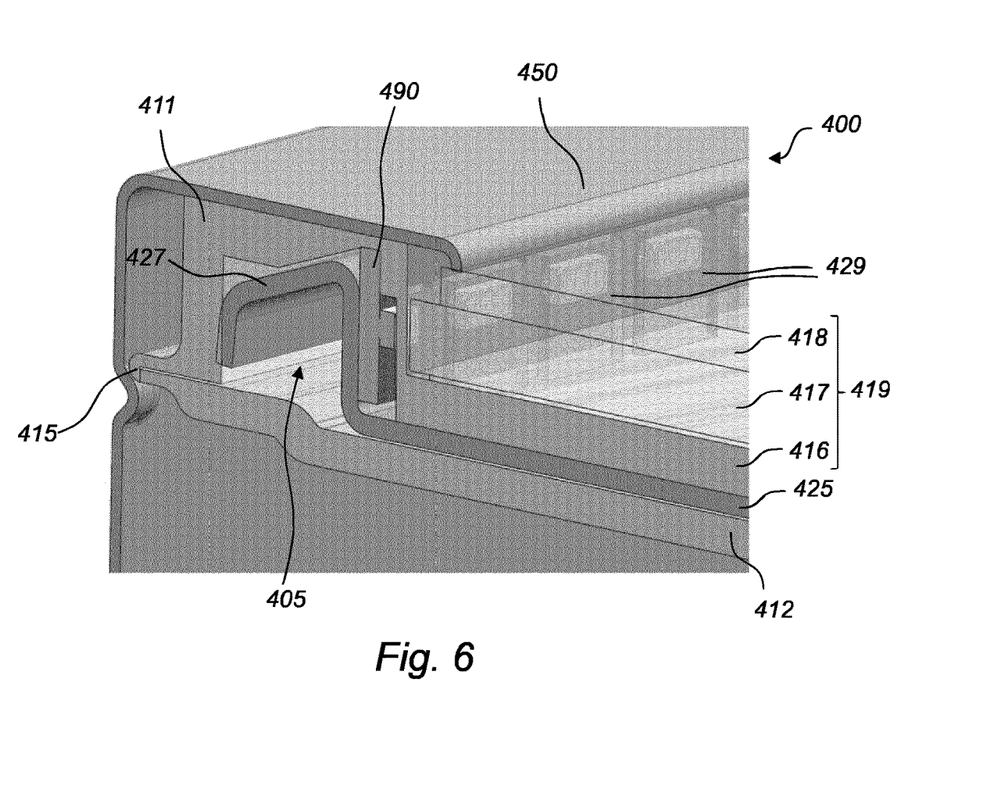

FIG. 6 schematically shows a cross sectional view of an example of an embodiment of a lighting module assembly 400.

The cross sectional view of FIG. 6 is taken across section along one of the elongated arms and shows elongated arm parts 411 and 412 connected by elongated hinge 415. Independently or when closed to each other along hinge 415, elongated arm parts 411 and 412 form a cavity 405. Inside cavity 405, a lighting element 490, for example in the form of a LED bar, can be arranged.

Lighting module assembly 400 is similar to light module assembly 300. Lighting module assembly 400 comprises a stack 419 of optical elements: a reflector 416, a light guide panel 417 and a diffuser 418.

Lighting module assembly 400 further comprises heat spreading element 425 arranged between arm parts 411 and 412 and optionally a frame 450 placed on top of the arms to cover up the arms and allow assembly of the module. Heating spreading element 425 has a spring portion 427 arranged to, when it is loaded, snap into cavity 405.

In this embodiment, reflector 416 is integrally formed, for example by injection molding, with the first and second arm parts 411 and 412. The reflector reflects light within the stack of optical elements, for example at the bottom of the stack, such that light scattered in any direction, is trapped within the stack, and can exit the module through the diffuser. In this way the light is not lost but reflected back towards the exits.

In an embodiment, elongated arm, in this example elongated arm part 411 is integrally formed with reflector 416.

The reflector is typically arranged at the bottom of the stack to reflect the light back towards the diffuser at the exit if the light.

Since the reflector is arranged at the bottom of the stack, when the reflector is integrally formed with the arm, the reflector overlaps the lighting element which would prevent the light, in use, to reach the stack.

To this purpose, grooves 429 are provided in the arm inside cavity 405, in this example in the first arm part 411, for letting in correspondence of the lighting element, in this example the LEDs of the LED bar, the light to pass through the grooves 429 and reach stack 419, in particular light guide plate 417 of stack 419. In this way lighting module assembly can properly function while the reflector 416 is integrally formed with the arm.

Figure 7:
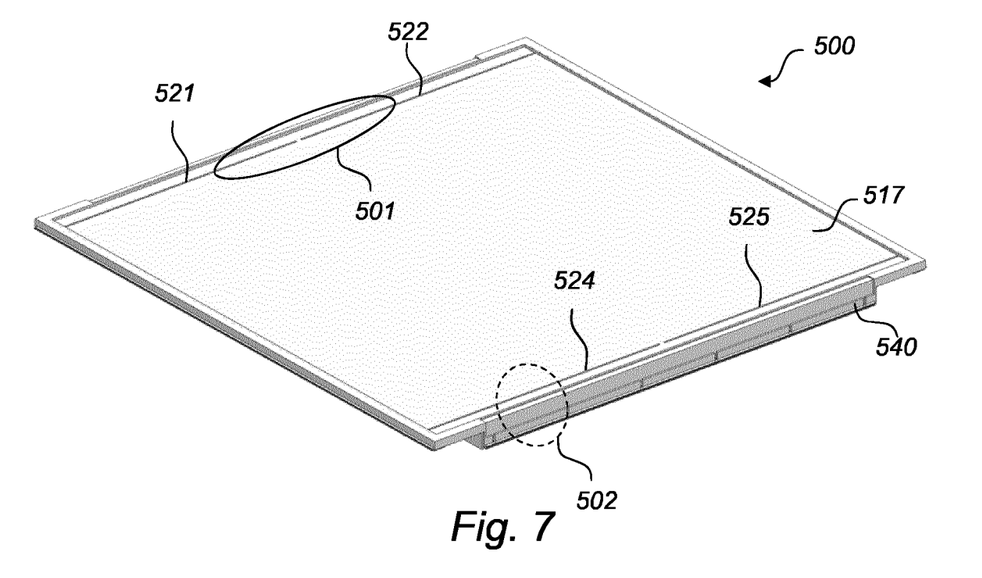

FIG. 7 schematically shows a perspective view of an example of an embodiment of a lighting module assembly 500 of which only a light guide plate 517 and elongated arm 540 are shown.

Lighting module assembly 500 can have a similar structure to lighting module assembly 400 described with FIG. 5. Light guide plate 517 may be integrally formed with one of the two arm parts of the frame, or with both arms as described above.

In an embodiment, light guide plate 517 comprises elongated openings 521, 522, 524 and 525 through light guide plate 517 arranged in the elongation direction at edges of lighting module assembly 500 in proximity of the elongated arms. Openings 521, 522 are arranged along the edge of one arm which does not contain the lighting element. Similarly openings 524 and 525 are arranged along the edges of arm 540 facing said one arm which also does not contain the lighting element. Enlarged view 501 of the openings is shown with reference to FIG. 7a.

Openings 521, 522 and openings 524, 525 (not shown in FIG. 7a) at the other edge of lighting module assembly confine the light within light guide plate 517. In this way, lighting module assembly can be operating more efficiently because light is kept within the module and not lost at the edges.

Figure 7A:
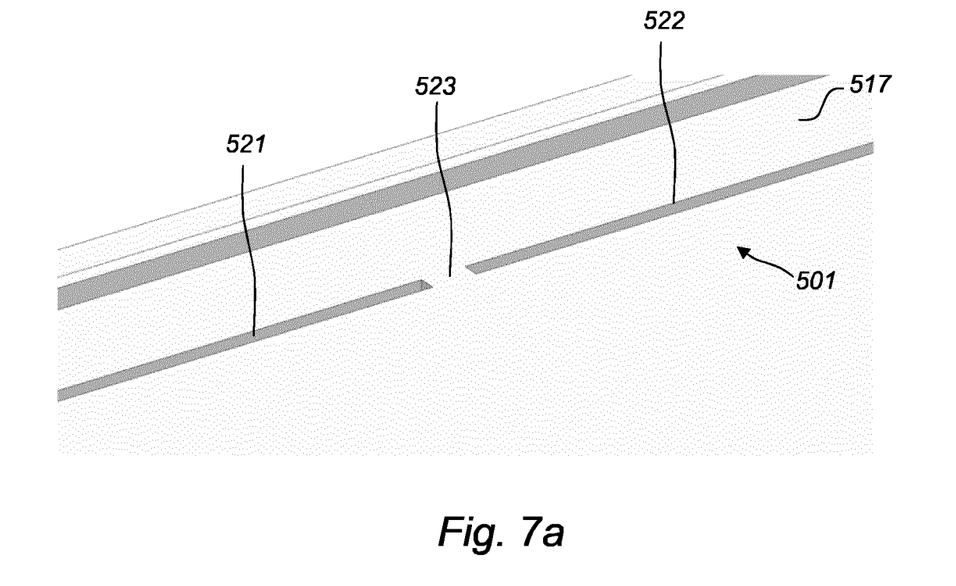

In an embodiment, light guide plate 517 comprises a bridge portion 523 which optically connects light guide plate 517 to the arms containing for example the driver unit.

Bridge portion 523 is a space between openings 521 and 522 in the elongation direction. Bridge portion 523 allows that light guide plate 517 has sufficient stiffness and does not break due to elongated through openings 521 and 522. A reflector may be placed through such openings 521, 522 for reflecting the light back into light guide plate 517.

Figure 7B:
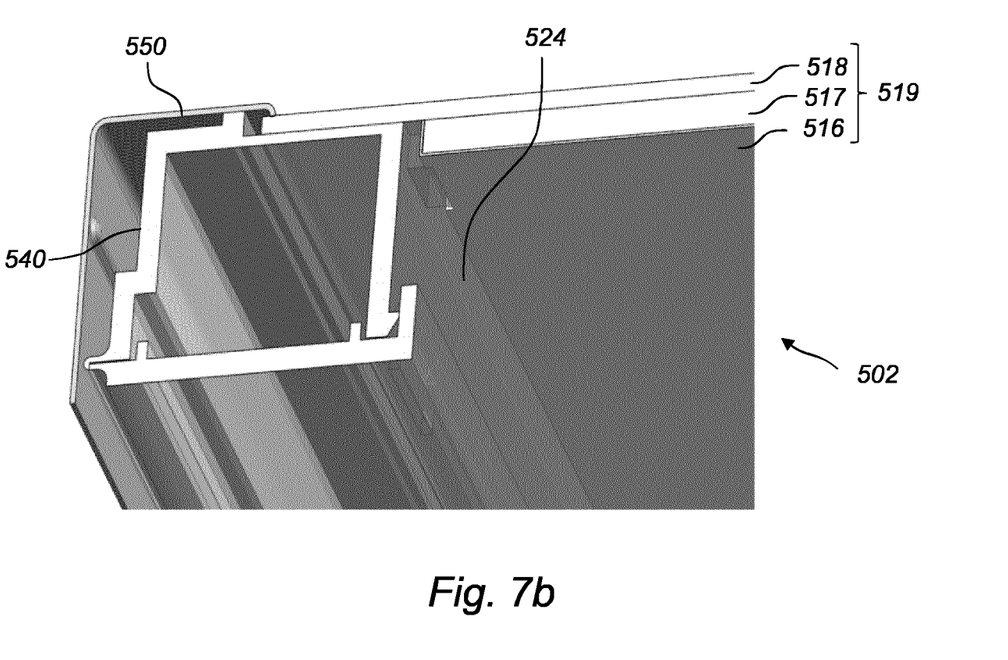

FIG. 7b schematically shows a second enlarged view 502 of the embodiment of the lighting module assembly 500 shown with reference to FIG. 7. This view corresponds to cross section taken along the frame of lighting module assembly 500 across arm 540.

With reference to FIG. 7b, it is thus shown arm 540, a stack 519 of optical elements comprising a reflector 516, a light guide plate 517 and a diffuser 518 and further a frame 550 partially covering up arm 540 and diffuser 518. In particular, reflector 516 is arranged under the stack and extends through elongated opening 524. In this way, light guide plate 517 is covered by a reflector not only at the backside but also at the lateral sides of light guide plate 517 at opening 524. All openings (not shown in FIG. 7b) may be covered by reflector in the same manner. The reflector prevents that light, in use of the lighting module assembly, is dispersed through the openings. Light is kept within the light guide plate. Light efficiency of the lighting module assembly has been further increased.

In an embodiment, lighting element 390 or 490 described above comprises one or more solid state light emitters. Examples of solid state light emitters are Light Emitting Diodes (LEDs), Organic Light Emitting diode(s) OLEDs, or, for example, laser diodes.

In some embodiments the solid state light emitter may be a blue light emitting LED, such as GaN or InGaN based LED, for example emitting primary light of the wavelength range from 440 to 460 nm. Alternatively, the solid state lighting element may emit blue, UV or violet light which is subsequently converted into light of longer wavelength(s) by one or more wavelength converting materials. Nevertheless, the LED might also be a direct phosphor converted LED.

In some embodiments the lighting element 390 or 490 may consist of various individual LED lighting elements, preferably color controllable, such as RGB or RGBW LED strips, RGB or RGBW linear lighting elements, RGB or RGBW entertainment lights and the like. Such LED lighting elements may contain one RGB or RGBW unit cell or a multitude of RGB or RGBW unit cells. The unit cells may be individually and/or collectively controllable in color depending on the current ratios between the red, green, blue and white LEDs. The various lighting elements may be used and powered individually.

The lighting elements may contain filters to color the light of a white light generating source, such as a halogen or xenon source. The filters may be electronically controllable to change the color via a digital command.

Figure 8:
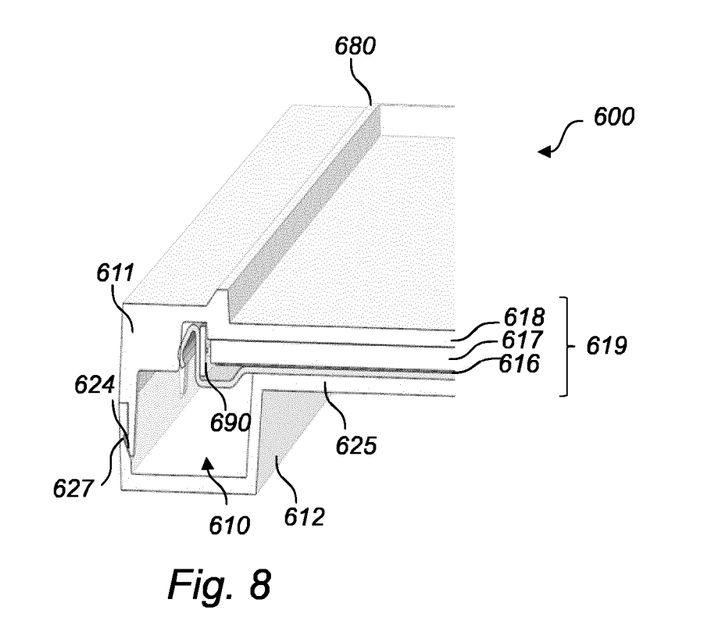

FIG. 8 schematically shows a perspective view of an embodiment of a lighting module assembly 600 of which only a cross section of arm 610 is shown in FIG. 8.

Lighting module assembly 600 comprises arm 610 formed by mated arm parts 611 and 612. Inside arm 610 is arranged a lighting element 690, for example a LEDs bar. In this embodiment, arm parts 611 and 612 are not mated by a hinge but are separate parts which are mated via a click system: arm part 611 is fitted into arm part 612 via respective engaging element 624 and receiving element 627.

Upper part of the light assembly module 600 is formed by a part which is integrally formed with diffuser 618 and which comprises arm part 611 and all other upper arm parts (not shown in FIG. 8). Bottom part of lighting module assembly is manufactured as separated from the upper part and comprises arm part 612 and all other bottom arm parts (not shown in FIG. 8). When upper part is mated to bottom part a frame is formed which can hold further optical elements: light guide plate 617 and reflector 616 of stack 619.

In lighting module assembly 600 diffuser 618 is integrally formed with the upper part, i.e. first elongated arm parts, of lighting module assembly 600.

This allows a light lighting module assembly. Also, since the light exits the module from diffuser 618, diffuser 618 and upper arm parts can be designed frameless. An extra frame such as frames 350, 450 and 550 of modules 300, 400 and 500, respectively, described above, may be omitted. For example, integrally formed upper part of the lighting module assembly can be designed with a suitable profile which is both aesthetically appealing and functional to the placement of the module on, for example, T bars installed on the ceiling against which the lighting module assembly is hung.

Light, in use of lighting module assembly 600, exits diffuser 618, thus diffuser 618 is made of a material suitable for transmitting light or being transparent to light. Part of the surface of diffuser 618 contains microstructures for diffusing the light by refraction, while other parts of the surface are optically smooth at the desired wavelength of the light.

In an embodiment, upper part of lighting module assembly 600 may be provided with a protrusion 680 along edges of lighting module assembly 600 overlapping lighting element 690 and extending with a slanted profile towards a direction perpendicular to the elongation direction along which the light, in use, exits the module. This direction is substantially perpendicular to a plane defined by diffuser 618.

The inventors have realized that by providing the upper part of lighting module assembly 600 with a protrusion 680 overlapping lighting element 690, a better light distribution can be achieved, in use, over an illuminated surface of lighting module assembly 600. In particular, it has been found, that for edge lit modules protrusion 680 prevents spottiness, an effect for which spots of light can be seen at the edges of the lighting module assembly where the lighting elements area placed.

In an embodiment, the slanted profile of the protrusion has an angle of 45 degrees or less. This embodiment has been found particular efficient to prevent spottiness.

Figure 9:
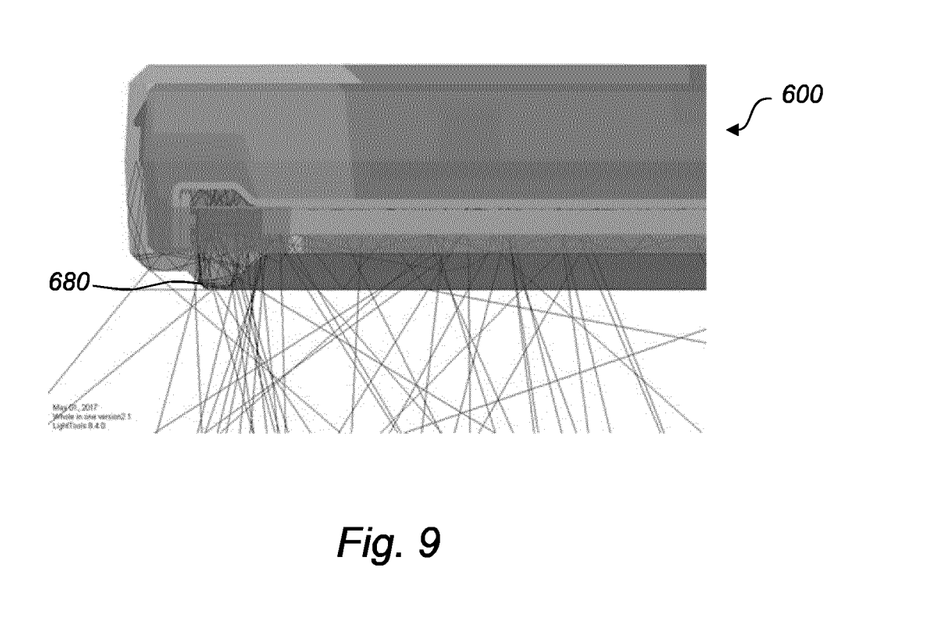

As shown in FIG. 9, showing an optical simulation of, in use, lighting module assembly 600, some light, indicated by black lines exiting lighting module assembly 600, can reach also sides of lighting module assembly 600 beyond protrusion 680 towards the very edges of lighting module assembly 600. This allows light to gradually fade away towards the edges, preventing an observer of the module, in use, to see so-called dark edges or dark rim.

Figure 10:
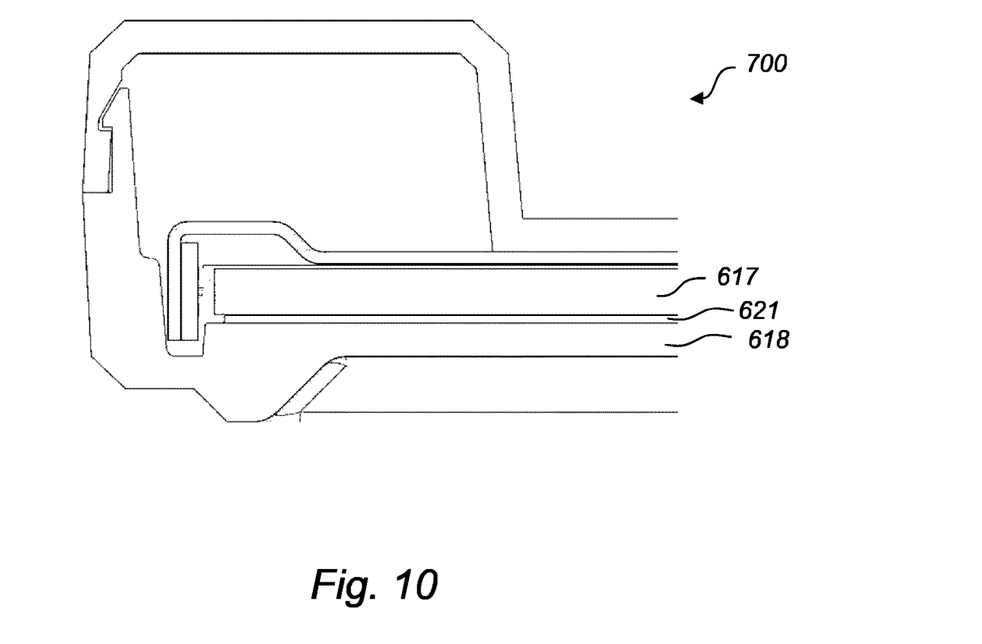

FIG. 10 schematically shows a cross section of an example of an embodiment of a lighting module assembly 700.

Lighting module assembly 700 differs from lighting module assembly 600 in that it further comprises an optical sheet 621 between light guide plate 617 and diffuser 618. Optical sheet 621 improves light distribution of light over the surface of diffuser 618. Optical sheet 621 is made of a transparent material with volume and/or surface scattering properties.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:
1. A lighting module assembly comprising:
  a stack of optical elements comprising a diffuser, a light guide plate, and a reflector,
  a plurality of elongated arms forming a frame for supporting the stack of optical elements, at least one elongated arm having a cavity extending in an elongation direction of the elongated arm, and
  at least one lighting element, wherein
  the cavity is arranged for receiving the at least one lighting element and for directing the light of the lighting element, in use, to the stack of optical elements, and
  each elongated arm comprises a first elongated arm part, wherein
  at least one first elongated arm part is integrally formed with at least one of the diffuser, and the light guide plate and, wherein
  at least one elongated arm comprises a second elongated arm part for joining in the elongation direction with the first elongated arm part of the same elongated arm.

2. A lighting module assembly according to claim 1, wherein said joining encloses the lighting element in the cavity.

3. A lighting module assembly according to claim 2, wherein the first elongated arm part and the second elongated arm part are integrally formed and connected together by a living hinge such that the first elongated arm part and second elongated arm part are arranged to be joined by bending the second elongated arm part relative to the first elongated arm part along the living hinge.

4. A lighting module assembly according to claim 2, wherein the first elongated arm part has at least a receiving element and the second elongated arm part has at least an engaging element, the engaging element for engaging the receiving element.

5. A lighting module assembly according to claim 4, wherein the engaging element is arranged to snap into the receiving element.

6. A lighting module assembly according to claim 2, wherein the first elongated arm parts and/or the second elongated arm parts are integrally formed by injection molding.

7. A lighting module assembly according to claim 2, wherein the first elongated arm part and/or the second elongated arm part are made of plastic.

8. A lighting module assembly according to claim 1, wherein the diffuser is integrally formed with the first elongated arm parts and comprises a protrusion along edges of the lighting module assembly overlapping the lighting element and extending with a slanted profile towards a direction perpendicular to the elongation direction along which the light, in use, exits the module, the slanted profile having an angle of 45 degrees or less.

9. A lighting module assembly according to claim 1, wherein the light guide plate is integrally formed with the first elongated arm parts and comprises elongated openings through the light guide plate arranged in the elongation direction at edges of the lighting module assembly in proximity of the elongated arms.

10. A lighting module assembly according to claim 9, comprising a reflector arranged under the light guide plate and extending through the elongated openings.

11. A lighting module assembly according to a claim 1, comprising a heat spreading element for spreading the heat generated, in use, by the lighting element, the heat spreading element arranged in the cavity on a back side of the lighting element for supporting the lighting element in the cavity and partially extending under the stack.

12. A lighting module assembly according to claim 11, wherein the heating spreading element comprises a spring portion arranged to snap into the cavity.

13. A lighting module assembly according to claim 1, further comprising a driver unit arranged in the cavity for controlling the at least one lighting element.

14. A lighting module assembly according to claim 1, wherein the lighting element comprises one or more light emitters.

15. A lighting module assembly according to claim 1, wherein the lighting module assembly comprises four internally connected elongated arms.

* * * * *